United States Patent
Miller et al.

(10) Patent No.: US 6,431,605 B1
(45) Date of Patent: Aug. 13, 2002

(54) CONSPICUITY PLATE ASSEMBLY FOR FENDER MOUNTING

(75) Inventors: Jerry G. Miller, Norton Shores; Timothy R. Hawes, Muskegon, both of MI (US)

(73) Assignee: Fleet Engineers, Incorporated, Muskegon, MI (US)

( * ) Notice: Subject to any disclaimer, the term of this patent is extended or adjusted under 35 U.S.C. 154(b) by 0 days.

(21) Appl. No.: 09/495,736

(22) Filed: Feb. 1, 2000

Related U.S. Application Data

(60) Provisional application No. 60/123,559, filed on Mar. 10, 1999.

(51) Int. Cl.[7] .................................................. B60Q 1/30
(52) U.S. Cl. ..................... 280/854; 280/183; 116/28 R
(58) Field of Search ................................ 280/854, 160, 280/183, 851, 847; 248/74.1, 74.2, 74.3, 201; 116/63 R, 28 R, 30, 35 R, 45; 359/515, 548, 520

(56) References Cited

U.S. PATENT DOCUMENTS

| | | | | |
|---|---|---|---|---|
| 3,582,108 A | * | 6/1971 | Carlton .................... | 280/154.5 |
| 3,876,284 A | * | 4/1975 | Appleton ..................... | 350/99 |
| 3,961,811 A | * | 6/1976 | Brilando et al. ............ | 280/289 |
| 4,245,888 A | * | 1/1981 | Wardecki ..................... | 350/97 |
| 4,377,294 A | * | 3/1983 | Lockwood et al. ... | 280/154.5 R |
| 4,575,189 A | * | 3/1986 | Johnson ....................... | 350/99 |
| 4,591,178 A | * | 5/1986 | Mortvedt et al. ........... | 280/154 |
| 4,740,003 A | * | 4/1988 | Antekeier ............... | 280/153 R |
| 4,960,294 A | * | 10/1990 | Leonard ...................... | 280/848 |
| 5,402,266 A | * | 3/1995 | Coligionis ................... | 359/548 |
| 5,731,895 A | * | 3/1998 | Owezarzak et al. ........ | 359/515 |
| 6,076,842 A | * | 6/2000 | Knoer .......................... | 280/154 |
| 6,109,655 A | * | 8/2000 | Wheeler ....................... | 280/847 |
| 6,152,469 A | * | 11/2000 | Gadowski ................... | 280/154 |

OTHER PUBLICATIONS

Author unknown, Fleet Engineers Incorporated Product Catalog, revised 1/99, cover, title page, table of contents page, and pp. 102 and 103.

Author unknown, Fleet Engineers Incorporated brochure entitled Conspicuity It's the Law!.

* cited by examiner

*Primary Examiner*—Avraham Lerner
*Assistant Examiner*—Tony Winner
(74) *Attorney, Agent, or Firm*—McGarry Bair LLP

(57) ABSTRACT

A conspicuity reflector mounting assembly for mounting on a truck fender in an orientation perpendicular to a road surface in compliance with DOT regulations comprises a plate having a flat panel surface for mounting a conspicuity reflector, and a mounting assembly adapted to mount the plate to a fender-mounting post at an orientation perpendicular to a road surface. The conspicuity reflector can be mounted to the flat panel surface. A truck fender is shown having a conspicuity reflector mounting assembly mounted theron.

20 Claims, 5 Drawing Sheets

CONSPICUITY PLATE ASSEMBLY FOR FENDER MOUNTING

This application claims the benefit of U.S. Provisional Application Serial No. 60/123,559 filed Mar. 10, 1999.

BACKGROUND OF THE INVENTION

1. Field of the Invention

The invention relates to conspicuity mountings for a tractor or other similar vehicle. In one of its aspects, the invention relates to a conspicuity plate mounting assembly for a vehicle fender. In another of its aspects, the invention relates to a fender with a conspicuity plate assembly mounted thereto.

2. Description of the Related Art

A recent U.S. Department of Transportation requirement states that all tractors built after Jul. 1, 1997, must use reflective material on rear fenders or horizontal hangers supporting mud flaps. Thus, many tractors on the road must be retrofit with such reflective material on the fenders or horizontal hangers. It is both desirable and required to attach the reflective material such that its reflective face is perpendicular to the road surface, not set at an angle. Thus, where reflective tape is merely added to the fender surface, it will not comply with the rule and the effective reflective surface will be decreased in direct proportion to the acuteness of the angle relative to the road surface. A simple, cost-effective solution for retrofitting existing tractors with reflective material as required by the Department of Transportation is needed.

SUMMARY OF THE INVENTION

According to the invention, a conspicuity plate assembly is adapted for mounting on and is mounted to a truck fender that has a generally arcuate shape about a fender axis and a relatively uniform width in the direction of the axis. The fender has an outer surface and is mounted at its outer surface to an elongated post, the post being parallel to the fender axis and having a length greater than the width of the fender. The post is adapted to mount the fender to a vehicle frame.

The conspicuity plate assembly comprises a conspicuity plate having a mounting surface of a length and height sufficient to mount a conspicuity reflector thereon, and a fastener adapted to mount the conspicuity plate to the mounting post. The conspicuity plate and fastener are further adapted to position the mounting surface of the conspicuity plate perpendicular to a road surface when the fender is mounted to the vehicle frame.

In a preferred embodiment, the conspicuity plate further comprises at least one mounting flange that cooperates with the fastener to secure the plate to the mounting post. The at least one mounting flange extends from a rear surface of the plate and has an aperture therethrough. The mounting flange is shaped to conform to an outer surface of the mounting post and be secured to the mounting-post by the fastener, which encircles the post and flange, passing through the opening in the flange.

In a further embodiment, the plate comprises multiple flanges, the flanges extending rearwardly from the mounting surface and being integrally formed with the plate. The flanges can be spaced rearwardly from the plate.

Other objects, features, and advantages of the invention will be apparent from the ensuing description in conjunction with the accompanying drawings.

DETAILED DESCRIPTION OF THE PREFERRED EMBODIMENTS

Figure 1:
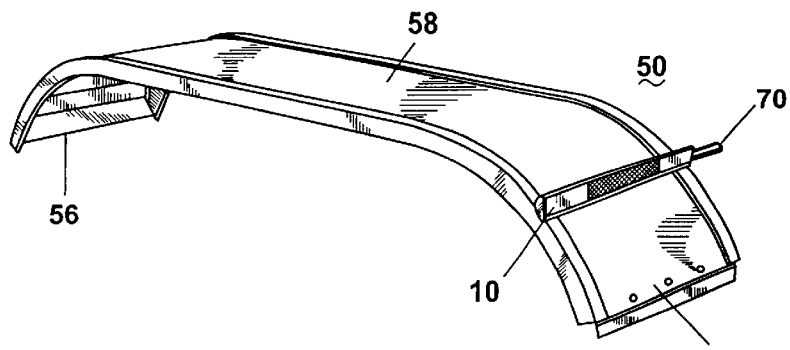
FIGS. 1, 2 and 3 are perspective views of three fender and conspicuity plate assemblies according to the invention.
Figure 2:
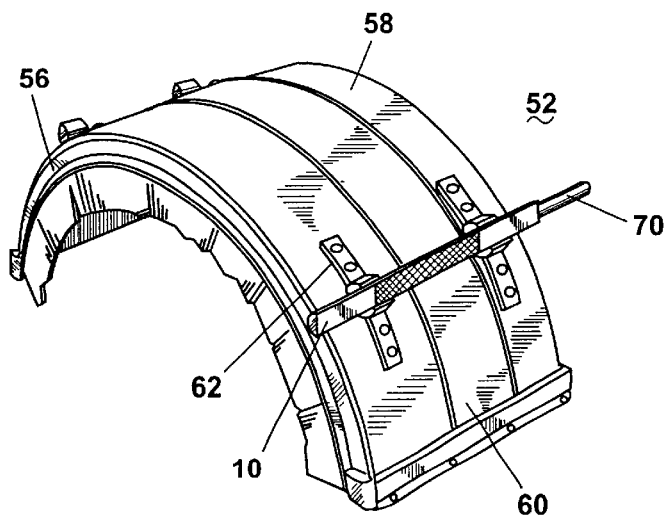
Figure 3:
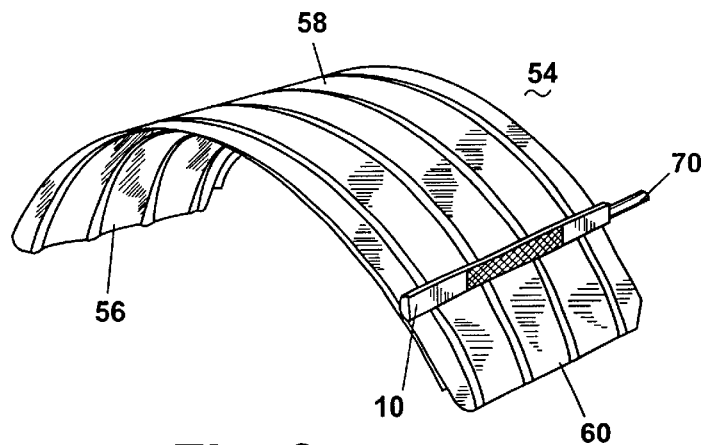
Figure 4:
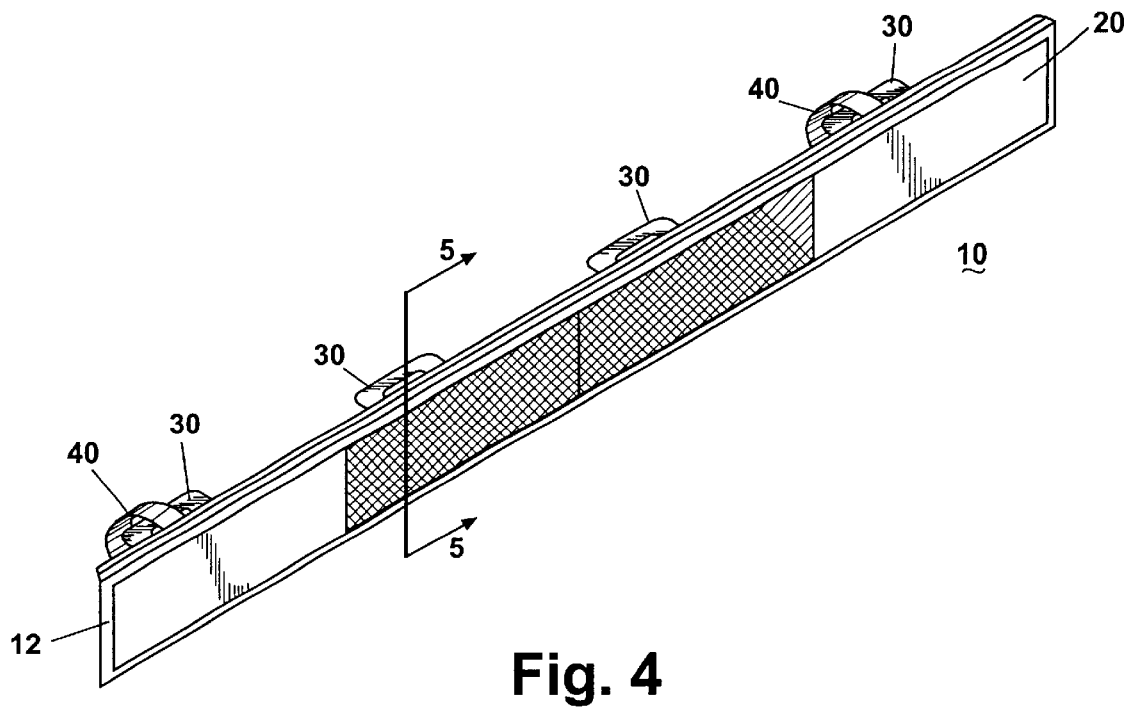
FIG. 4 is a front perspective view of the conspicuity plate according to the invention.

As shown generally in FIGS. 1–3, a conspicuity plate 10 is mounted to a fenders 56, 52, 54, the fenders 50, 52, 54 typically include a curved leading portion 56, a horizontal portion 58, and a curved trailing portion 60. The fenders 50, 52, 54 are mounted to the vehicle frame 80 adjacent the tires 26 (see FIGS. 8 and 10) in a standard fashion. A mud flap 28 (See FIG. 10) can be mounted at the terminal edge of the trailing portion 60 of the fenders 50, 52, 54 to the rear of the tires. Further, a spray suppressant apparatus can be selectively mounted to the fenders 50, 52, 54. The fenders 50, 52, 54 are described for use with a semi-tractor 24, although it should be understood that the conspicuity plate 10 according to the invention can be employed on any vehicle with ground-engaging tires including semi-trailers, and trucks.

Each fender 50, 52, 54 includes a mounting bracket 62, shown best in FIG. 2, for receiving the mounting post 70 and thereby securing the fender 50, 52, 54 to the semi-tractor. It is preferred that a pair of mounting brackets 62, in spaced-apart relationship, define an opening for receiving the mounting post 70. When the post 70 is within the opening of the mounting brackets 62, a locking mechanism (not shown) retains the post 70 within the bracket 62, preferably by means of a threaded screw through the mounting bracket 62 into the mounting post 70 or by a compression clamp mounted to and circumscribing the mounting post 70 and through the mounting bracket 62, such as that shown in U.S. Pat. No. 4,740,003 to Antekeier, incorporated herein by reference. The conventional connection of the fenders 50, 52, 54 to the mounting post 70 provides a rigid connection of the fenders 50, 52, 54 to the semi-tractor. To provide a reflective surface for safety, and to comply with rules enforced by the U.S. Department of Transportation for all semi-tractors built after Jul. 1, 1997, it is necessary to provide a vertical surface for mounting a reflective material.

Referring now to FIGS. 4–7, the conspicuity plate 10 includes a front panel 12 for mounting a conspicuity reflector 20, the front panel 12 having a rear surface 14 from which extend mounting flanges 30. Fasteners 40 cooperate with the flanges 30 to mount the conspicuity plate 10 to the mounting post 70.

Figure 5:
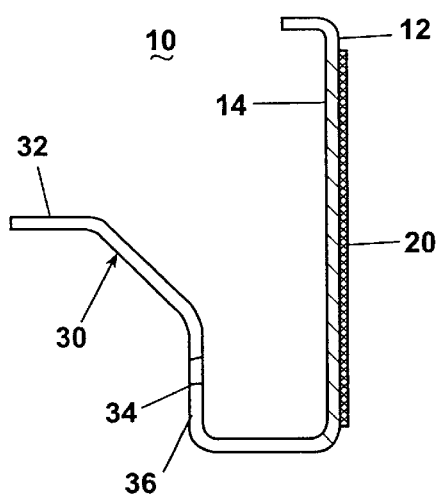
FIG. 5 is a cross-sectional view taken through line 5—5 of FIG. 4.
Figure 6:
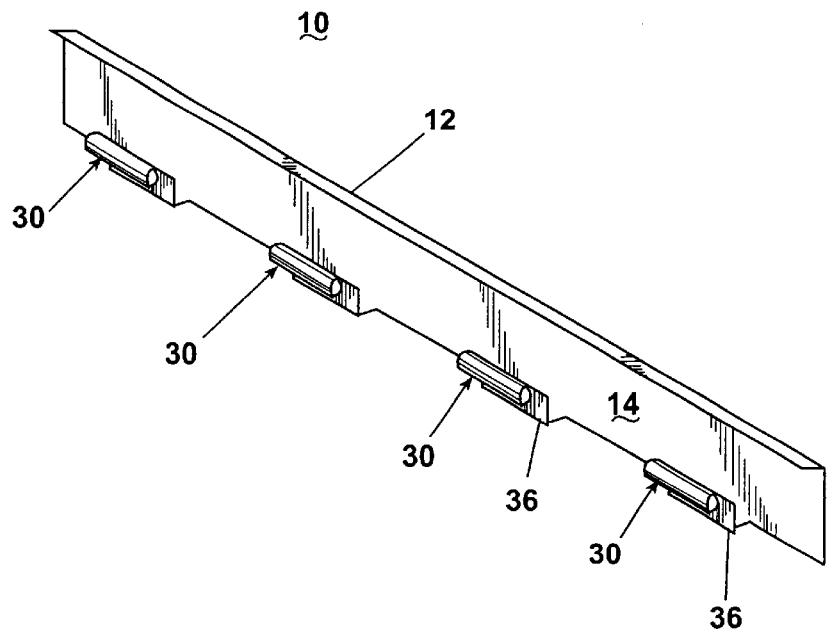
FIG. 6 is a rear perspective view of the conspicuity plate of FIGS. 4 and 5.
Figure 7:
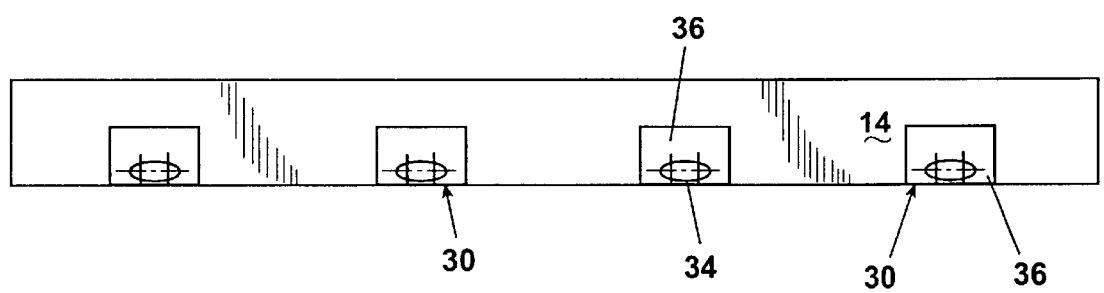
FIG. 7 is a rear view of the conspicuity plate of FIGS. 4–6.

The flanges 30 of the conspicuity plate 10 are shown best in FIGS. 5–7 and are preferably formed integrally with the plate 10. The flanges 30 includes an outwardly-arching extension 32 having an opening 34 formed in generally vertically-extending portion 36. While the conspicuity plate 10 is shown preferably with four flanges 30, it is contemplated that as few as two and as many as ten extensions can be used, depending on the length of the mounting post 70 and the width of the fenders 50, 52, 54. Further, while the outwardly-arching extension 32 is shown to comprise a series of planar surfaces set at angles to each other to form an arch or concave surface, a similar structure can be reached by forming an arcuate extension from the rear surface 14 of the plate 10.

Figure 8:
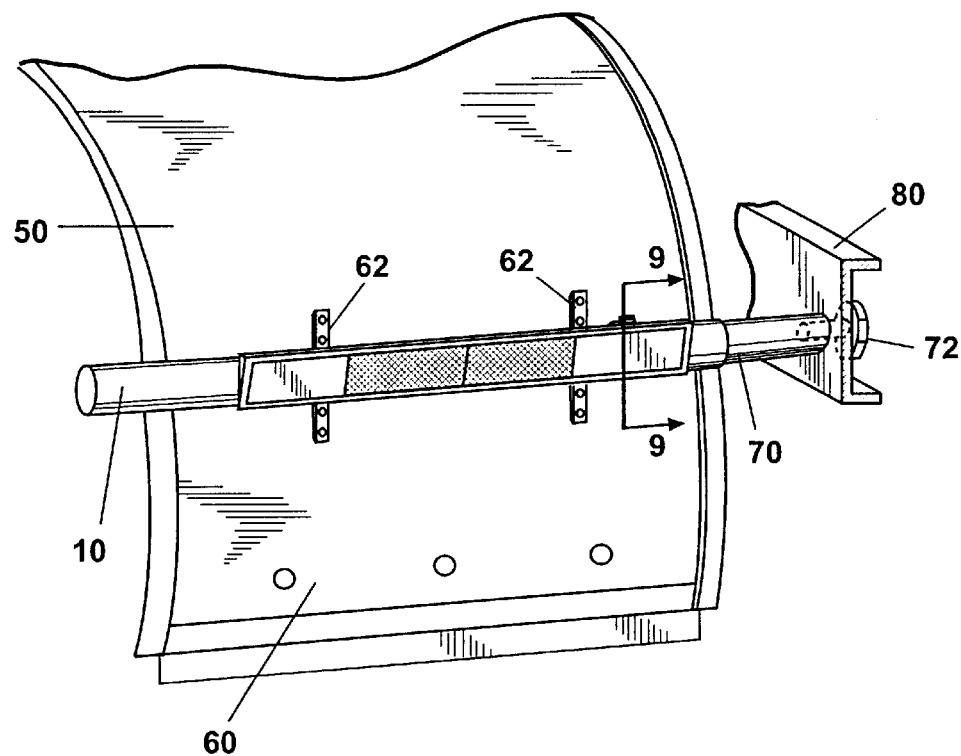
FIG. 8 is a partial perspective view of the conspicuity plate of FIGS. 4–7 attached to a fender and mounting post mounted to a vehicle frame.
Figure 9:
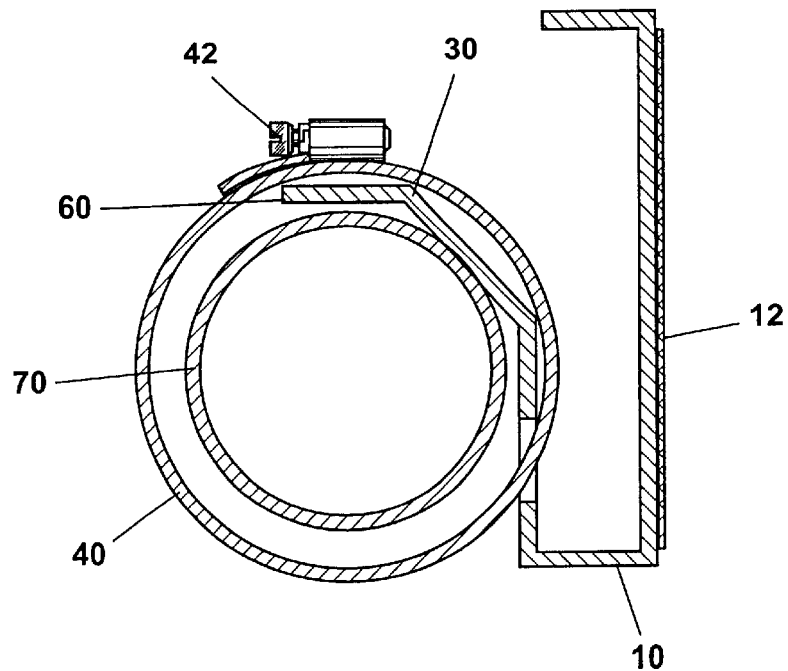
FIG. 9 is a cross-sectional view taken through line 9—9 of FIG. 8.

Referring now to FIGS. 8 and 9, with the conspicuity plate 10 installed on the mounting post 70, the concave surface of the extension 32 abuts the mounting post 70, which at least partially supports the conspicuity plate 10. The fastener 40, shown as a worn-drive clamp, secures the conspicuity plate 10 to the mounting post 70. More preferably, fastener 40 is a swivel lock run drive clamp as manufactured by Ideal-Stant under the trade mark SNAPLOCK.

The fastener 40 circumscribes the mounting post 70 and extends through the opening 34 in the extension 32 of flange 30. When the ends of the fastener 40 are secured together and tightened, the conspicuity plate 10 is secured to the mounting post 70 with the flange 30 encompassed by fastener 40. The fastener 40 is tightened by driving the included screw 42, thereby reducing the diameter of the fastener 40, to hold the flange 30 into tight abutment against the mounting post 70. Until the fastener 40 is fully tightened and the conspicuity plate 10 is secured tightly to the mounting post 70, the angle of the front panel 12 relative to horizontal can be adjusted so that the front panel 12 can be made generally perpendicular to the road surface supporting the semi-tractor, whereby the effective cross-sectional area of reflective material is maximized.

The conspicuity reflector 20 is preferably reflective tape applied to the front panel 12. Such reflective tape can be purchased from suppliers such as 3M, for example, under the trademarks SCOTCHCAL™ or SCOTCHLITE™. Any suitable conspicuity reflector 20 can be mounted to the front panel 12, preferably by a pressure-sensitive adhesive.

Figure 10:
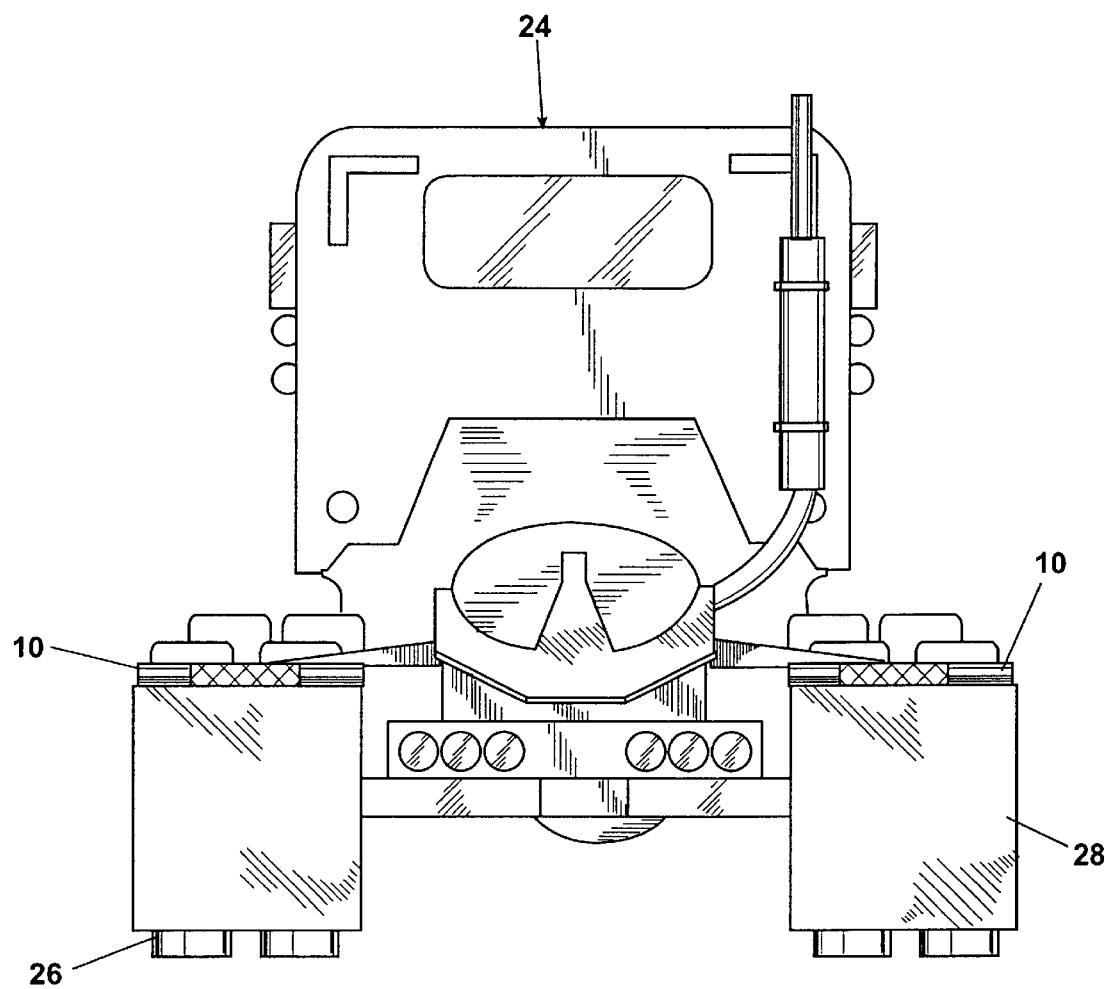
FIG. 10 is a rear view of a semi-tractor with conspicuity plates of FIGS. 4–7 mounted to a rear fender thereof.

Referring to FIGS. 8–10, the fender 50 is rigidly secured to a frame 80 of a semi-tractor 24 or other similar vehicle through a mounting post 70. Customarily, the frame 80 is a substantially C-shaped member in cross section, and constitutes that portion of the semi-tractor chassis positioned at a point slightly inward of a set of wheels mounted to the semi-tractor. Further, as is customary, the mounting post 70 needed to mount the fender 50 to the frame 80 is positioned transversely to the longitudinal axis of the frame 80 and is rigidly secured to the frame 80. In the illustrated embodiment of FIGS. 8 and 9, the post 70 is secured to the frame 80 by a post mounting bolt 72, however the conspicuity plate 10 according to the invention can mount on a mounting post secured to the vehicle frame 80 by any one of a variety of fasteners. For example, as shown in U.S. patent to Lockwood et al., U.S. Pat No. 4,377,294, issued Mar. 22, 1983, incorporated herein by reference, a mounting rod is shown as a cylindrical tube having welded within the inner end thereof a mounting socket in the tube. The mounting rod is secured to the frame by a bolt extending through a hole in the frame and set into tight threaded engagement with the nut. Alternatively, it is contemplated that the mounting rod can be of the type disclosed in U.S. patent to Lea, U.S. Pat. No. 3,922,003, issued Nov. 25, 1975, incorporated herein by reference. The Lea patent shows a mounting rod as an elongated solid bar matingly engaging and rigidly secured to a top horizontal portion of the frame by a plurality of U-bolts.

While particular embodiments of the invention have been shown, it will be understood that the invention is not limited thereto since modifications may be made by those skilled in the art, particularly in light of the foregoing teachings. Reasonable variation and modification are possible within the scope of the foregoing disclosure without departing from the spirit of the invention which is defined in the appended claims.

What is claimed is:

1. In a truck fender having a generally arcuate shape about a fender axis and a relatively uniform width, the fender having an outer surface, an elongated mounting post having a longitudinal axis and spanning a substantial portion of the width of the fender and mounted to the outer surface of the fender parallel to the fender axis, the elongated mounting post being adapted to mount the fender to a vehicle frame, the improvement comprising:

a conspicuity plate having a mounting surface of a length and height sufficient to mount a conspicuity reflector thereon; and a fastener mounting the conspicuity plate to the mounting post for adjustment of the conspicuity plate about the longitudinal axis of the post to adjustably position the mounting surface of the conspicuity plate perpendicular to a road surface when the fender is mounted to the vehicle frame.

2. The truck fender of claim 1 and further comprising a conspicuity reflector mounted on the mounting surface of the conspicuity plate.

3. The truck fender of claim 2 wherein the conspicuity plate further comprises a front panel forming the mounting surface and at least one mounting flange extending rearwardly of the front panel, the at least one mounting flange bent into a configuration generally conforming to an outer surface of the elongated post; the fastener securing the at least one mounting flange to the mounting post.

4. The truck fender of claim 1 wherein the conspicuity plate further comprises a front panel forming the mounting surface thereon and at least one mounting flange extending rearwardly of the front panel, the at least one mounting flange bent into a configuration generally conforming to an outer surface of the elongated post; the fastener securing the at least one mounting flange to the mounting post.

5. In a truck fender having a generally arcuate shape about a fender axis and a relatively uniform width, the fender having an outer surface, an elongated mounting post spanning a substantial portion of the width of the fender and mounted to the outer surface of the fender parallel to the fender axis, the elongated mounting post being adapted to mount the fender to a vehicle frame, the improvement comprising:

a conspicuity plate having:
  a front panel forming a mounting surface thereon of a length and height sufficient to mount a conspicuity reflector thereon; and
  at least one mounting flange extending rearwardly of the front panel, the at least one mounting flange bent into a configuration generally conforming to an outer surface of the elongated post, the at least one mounting flange having an opening; and a fastener passing through the opening of the at least one mounting flange for mounting the conspicuity plate to the post to position the mounting surface of the conspicuity plate perpendicular to a road surface when the fender is mounted to the vehicle frame, and to secure the at least one mounting flange to the mounting post.

6. The truck fender of claim 5 wherein the fastener encircles the mounting post and through a portion of the at least one mounting flange to clamp the at least one mounting flange to the mounting post.

7. The truck fender of claim 6 wherein there are multiple mounting flanges, each mounting flange having an opening, and multiple fasteners encircling the mounting post and through a portion of each of the mounting flanges to clamp each of the mounting flanges to the mounting post.

8. The truck fender of claim 7, wherein the mounting flanges are spaced rearwardly from the front panel.

9. In a truck fender having a generally arcuate shape about a fender axis and a relatively uniform width, the fender having an outer surface, an elongated mounting post spanning a substantial portion of the width of the fender and mounted to the outer surface of the fender parallel to the fender axis, the elongated mounting post being adapted to mount the fender to a vehicle frame, the improvement comprising:
   a conspicuity plate having:
      a front panel forming a mounting surface of a length and height sufficient to mount a conspicuity reflector thereon; and
      at least one mounting flange extending rearwardly of the front panel and spaced rearwardly from the front panel, the at least one mounting flange bent into a configuration generally conforming to an outer surface of the elongated post; and
   a fastener mounted to the conspicuity plate and to the mounting post for mounting the conspicuity plate to the post to position the mounting surface of the conspicuity plate perpendicular to a road surface when the fender is mounted to the vehicle frame, the fastener securing the at least one mounting flange to the mounting post.

10. The truck fender of claim 9, wherein the at least one mounting flange is integrally formed with the front panel.

11. A conspicuity plate assembly for mounting a conspicuity reflector on a truck fender having a generally arcuate shape about a fender axis and a relatively uniform width, the fender having an outer surface and being mounted at the outer surface to an elongated post having a longitudinal axis, the post being parallel to the fender axis and spanning a substantial portion of the width of the fender and adapted to mount the fender to a vehicle frame; the conspicuity plate assembly comprising:
   a conspicuity plate having a mounting surface of a length and height sufficient to mount a conspicuity reflector thereon, and
   a fastener mounted to the conspicuity plate and adapted to mount the conspicuity plate to the mounting post for adjustment about the longitudinal axis of the mounting plate to adjustably position the mounting surface of the conspicuity plate perpendicular to a road surface when the fender is mounted to the vehicle frame.

12. The conspicuity plate assembly of claim 11 and further comprising a conspicuity reflector mounted on the mounting surface of the conspicuity plate.

13. The conspicuity plate assembly of claim 12 wherein the conspicuity plate further comprises a front panel forming the mounting surface and at least one mounting flange extending rearwardly of the front panel, the at least one mounting flange bent into a configuration generally conforming to an outer surface of the elongated post; the fastener securing the at least one mounting flange to the mounting post.

14. The conspicuity plate assembly of claim 11 wherein the conspicuity plate further comprises a front panel forming the mounting surface thereon and at least one mounting flange extending rearwardly of the front panel, the at least one mounting flange bent into a configuration generally conforming to an outer surface of the elongated post; the fastener securing the at least one mounting flange to the mounting post.

15. A conspicuity plate assembly for mounting a conspicuity reflector on a truck fender having a generally arcuate shape about a fender axis and a relatively uniform width, the fender having an outer surface and being mounted at the outer surface to an elongated post, the post being parallel to the fender axis and spanning a substantial portion of the width of the fender and adapted to mount the fender to a vehicle frame; the conspicuity plate assembly comprising:
   a conspicuity plate having:
      a front panel forming a mounting surface of a length and height sufficient to mount a conspicuity reflector thereon, and
      at least one mounting flange extending rearwardly of the front panel, the at least one mounting flange bent into a configuration generally conforming to an outer surface of the elongated post, the at least one mounting flange has an opening; and
   a fastener passing through the opening of the at least one mounting flange and adapted to secure the at least one mounting flange of the conspicuity plate to the mounting post and further adapted to position the mounting surface of the conspicuity plate perpendicular to a road surface when the fender is mounted to the vehicle frame.

16. The conspicuity plate assembly of claim 15 wherein the fastener encircles the mounting post and through a portion of the at least one mounting flange to clamp the at least one mounting flange to the mounting post.

17. The conspicuity plate assembly of claim 16 wherein there are multiple mounting flanges, each mounting flange having an opening, and multiple fasteners encircling the mounting post and through a portion of each of the mounting flanges to clamp each of the mounting flanges to the mounting post.

18. The conspicuity plate assembly of claim 17 wherein the mounting flanges are spaced rearwardly from the front panel.

19. A conspicuity plate assembly for mounting a conspicuity reflector on a truck fender having a generally arcuate shape about a fender axis and a relatively uniform width, the fender having an outer surface and being mounted at the outer surface to an elongated post, the post being parallel to the fender axis and spanning a substantial portion of the width of the fender and adapted to mount the fender to a vehicle frame; the conspicuity plate assembly comprising:
   a conspicuity plate having:
      a front panel forming a mounting surface of a length and height sufficient to mount a conspicuity reflector thereon, and
      at least one mounting flange extending rearwardly of the front panel and spaced rearwardly from the front panel, the at least one mounting flange bent into a configuration generally conforming to an outer surface of the elongated post; and
   a fastener mounted to the conspicuity plate and adapted to secure the at least one mounting flange of the conspicuity plate to the mounting post and further adapted to position the mounting surface of the conspicuity plate perpendicular to a road surface when the fender is mounted to the vehicle frame.

20. The conspicuity plate assembly of claim 19 wherein the at least one mounting flange is integrally formed with the front panel.

* * * * *